United States Patent
Lee et al.

(10) Patent No.: US 8,523,430 B2
(45) Date of Patent: Sep. 3, 2013

(54) ULTRA THIN TEMPERATURE SENSOR DEVICE

(75) Inventors: Chung Kook Lee, Daejeon (KR); Young Seong Wang, Daejeon (KR); Cheol Jin Jeong, Buyeo-gun (KR)

(73) Assignee: Lattron Co. Ltd., Daejeon (KR)

( * ) Notice: Subject to any disclaimer, the term of this patent is extended or adjusted under 35 U.S.C. 154(b) by 262 days.

(21) Appl. No.: 12/911,444

(22) Filed: Oct. 25, 2010

(65) Prior Publication Data

US 2012/0027046 A1 Feb. 2, 2012

(30) Foreign Application Priority Data

Jul. 28, 2010 (KR) ........................ 10-2010-0073009

(51) Int. Cl.
*G01K 7/00* (2006.01)

(52) U.S. Cl.
USPC .......... 374/163; 374/185; 374/208; 338/22 R; 338/25

(58) Field of Classification Search
USPC .......... 374/163, 185, 179, 208, 100; 116/216
See application file for complete search history.

(56) References Cited

U.S. PATENT DOCUMENTS

| | | | | |
|---|---|---|---|---|
| 4,085,398 A * | 4/1978 | Bertram et al. | ................. | 338/25 |
| 4,449,035 A * | 5/1984 | Schwob | ...................... | 219/251 |
| 5,349,322 A * | 9/1994 | Yajima et al. | .................... | 338/25 |
| 5,372,427 A * | 12/1994 | Padovani et al. | ............. | 374/185 |
| 5,462,359 A * | 10/1995 | Reichl et al. | .................. | 374/148 |
| 5,660,473 A * | 8/1997 | Noma et al. | .................. | 374/145 |
| 6,297,723 B1 * | 10/2001 | Shoji et al. | ....................... | 338/28 |
| 6,380,840 B1 * | 4/2002 | Wienand et al. | ............... | 338/25 |
| 6,475,604 B1 * | 11/2002 | Fujii et al. | ..................... | 428/209 |
| 6,880,969 B2 * | 4/2005 | Adachi et al. | ................. | 374/185 |
| 6,899,457 B2 * | 5/2005 | Kurano | ......................... | 374/185 |
| 7,855,632 B1 * | 12/2010 | Schuh et al. | ................... | 338/28 |
| 8,092,085 B2 * | 1/2012 | Kawase et al. | ............... | 374/185 |
| 8,118,485 B2 * | 2/2012 | Nyffenegger | ................ | 374/185 |
| 2005/0174212 A1 * | 8/2005 | Abe et al. | ....................... | 338/25 |
| 2007/0104247 A1 * | 5/2007 | Takahashi | .................... | 374/185 |
| 2007/0248144 A1 * | 10/2007 | Yu | .................................. | 374/208 |
| 2008/0080592 A1 * | 4/2008 | Houben et al. | ............... | 374/185 |
| 2008/0205484 A1 * | 8/2008 | Toudou et al. | ............... | 374/185 |
| 2009/0174520 A1 * | 7/2009 | Wada et al. | .................... | 338/25 |
| 2010/0183046 A1 * | 7/2010 | Hori et al. | ..................... | 374/185 |
| 2011/0044374 A1 * | 2/2011 | Bergeron | ...................... | 374/208 |
| 2012/0063488 A1 * | 3/2012 | Nakayama et al. | ........... | 374/185 |

* cited by examiner

*Primary Examiner* — Gail Verbitsky

(74) *Attorney, Agent, or Firm* — Drinker Biddle & Reath LLP

(57) ABSTRACT

An ultra thin temperature sensor device includes a temperature sensor element, lead frames for allowing the temperature sensor element to be interposed and fastened between the lead frames, a supporter for protecting the temperature sensor element, and a film for enclosing and insulating the temperature sensor element, the lead frames, and the supporter. The supporter is formed to be larger than the temperature sensor element.

5 Claims, 4 Drawing Sheets

ULTRA THIN TEMPERATURE SENSOR DEVICE

CROSS-REFERENCE TO RELATED APPLICATION

This application claims the priority of Korean Patent Application No. 10-2010-0073009, filed Jul. 28, 2010 in the Korean Patent Office, which is incorporated herein by reference in its entirety

BACKGROUND

1. Field of the Invention

The invention relates generally to temperature sensor devices and, more particularly, to an ultra thin temperature sensor device, which is resistant to damage from external impact.

2. Description of the Related Art

Generally, electronic devices such as mobile communication terminals, notebook computers, Portable Multimedia Players (PMPs), digital cameras and digital camcorders use rechargeable battery packs so that users can use the electronic devices while carrying them.

Such a battery pack employs a temperature sensor device to detect a current temperature and protect the inside of the battery from variations in the internal temperature of the battery when a lithium ion cell performs a discharging operation.

FIG. 1 is a view showing a conventional temperature sensor device. In FIG. 1, a temperature sensor element 10 is fastened between lead frames 11, and the temperature sensor element 10 and the lead frames 11 are coated with an insulating film 12 so that they can be insulated.

However, such a conventional temperature sensor device is problematic in that it cannot be sufficiently protected from external impact, such as impact loads or compressive forces, and defective temperature sensor devices may be produced. In particular, a problem arises in that when a temperature sensor device is mounted on the battery cell of a notebook computer, and then the battery cell is pressed by a plastic pack, the temperature sensor device is broken down every time.

SUMMARY

Accordingly, the invention has been made keeping in mind the above problems occurring in the prior art, and an embodiment of the invention is to provide an ultra thin temperature sensor device, which can mitigate the breaking down of the temperature sensor device even when subjected to external force or impact.

According to an embodiment, the invention provides an ultra thin temperature sensor device, including a temperature sensor element; lead frames for allowing the temperature sensor element to be interposed and fastened between the lead frames; a supporter for protecting the temperature sensor element; and a film for enclosing and insulating the temperature sensor element, the lead frames, and the supporter.

The supporter may be formed to be higher than the temperature sensor element.

The supporter may be made of one selected from among a ceramic, a polymer, and an insulating-coated metal.

The film may be a polymer-based film.

The polymer-based film may be one selected from among polyimide, polyester and Teflon films

BRIEF DESCRIPTION OF THE DRAWINGS

The above and other objects, features and advantages will be more clearly understood from the following detailed description of various embodiments taken in conjunction with the accompanying drawings, in which.

DESCRIPTION OF THE PREFERRED EMBODIMENTS

Figure 1:
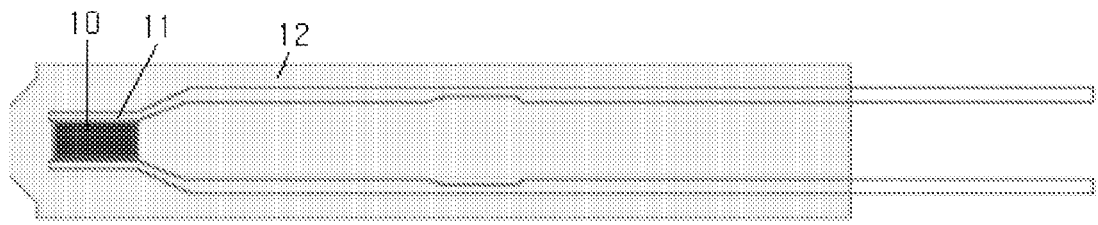
FIG. 1 is a plan view showing a conventional ultra thin temperature sensor device.

Hereinafter, the construction and operation of embodiments of the invention will be described with reference to the accompanying drawings.

Reference now should be made to the drawings, in which the same reference numerals are used throughout the different drawings to designate the same or similar components.

Figure 2:
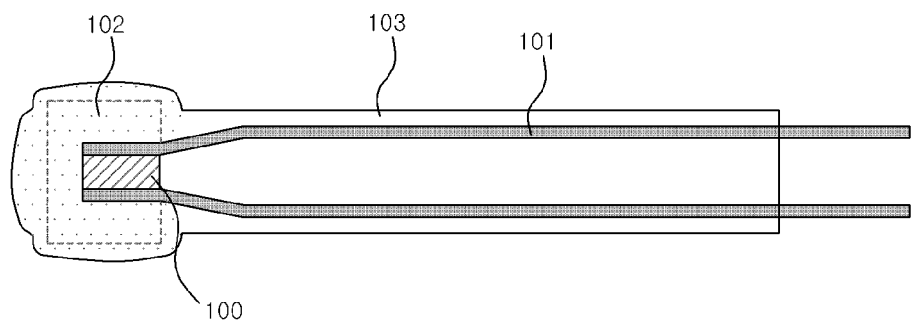
FIG. 2 is a plan view showing an ultra thin temperature sensor device according to an embodiment of the invention.
Figure 3A:
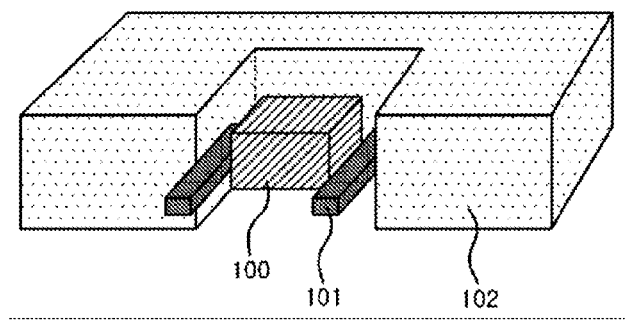
FIGS. 3A and 3B are views showing the steps of a process for manufacturing the ultra thin temperature sensor device according to an embodiment of the invention.
Figure 3B:
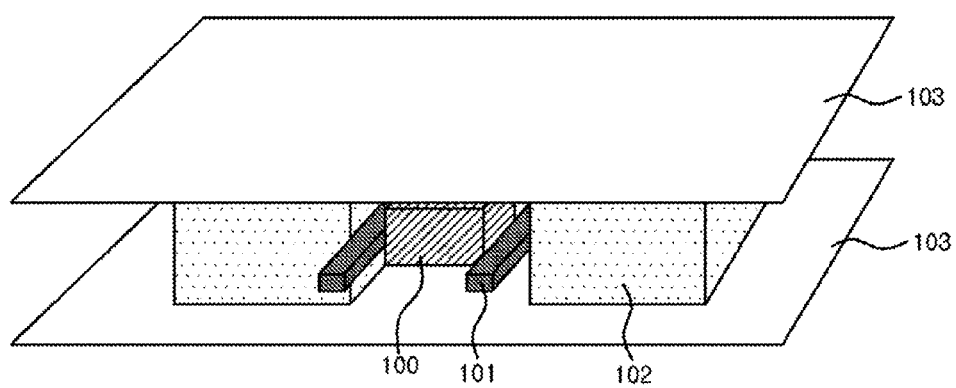
Figure 4:
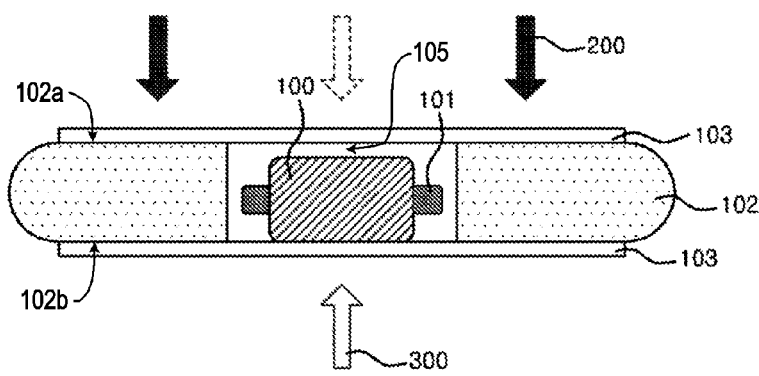
FIG. 4 is a sectional view showing the ultra thin temperature sensor device according to an embodiment of the invention.

FIG. 2 is a plan view showing an ultra thin temperature sensor device according to an embodiment of the invention, FIGS. 3A and 3B are views showing a process for manufacturing the ultra thin temperature sensor device according to an embodiment of the invention, and FIG. 4 is a sectional view showing the ultra thin temperature sensor device according to an embodiment of the invention.

As shown in FIG. 2, the ultra thin temperature sensor device according to an embodiment of the invention includes a temperature sensor element 100 for sensing temperature, lead frames 101 for supplying power to the temperature sensor element 100, a supporter 102 for protecting the temperature sensor element 100, and films 103 for enclosing and insulating the supporter 102, the temperature sensor element 100, and the lead frames 101.

In this case, the temperature sensor element 100 is interposed and fastened between the lead frames 101 via soldering.

Here, the supporter 102 protects the temperature sensor element 100 fastened between the lead frames 101. The supporter 102 may be made of any one selected from among a ceramic, a polymer, and an insulting-coated material.

Each film 103 may be implemented as a film made of an insulating material or an insulating layer, and, alternatively may be implemented as a polymer-based film such as a polyimide, polyester or Teflon film.

As shown in FIG. 3A, the method of manufacturing the ultra thin temperature sensor device according to an embodiment of the invention is configured to connect the temperature sensor element 100 for sensing temperature to the lead frames 101, and to insert the temperature sensor element 100 connected to the lead frames 101 into the supporter 102. In this case, the support 102 may be formed in any shape as long as it is formed to be larger than the temperature sensor element 100, and may be formed in a 'U' shape.

Thereafter, as shown in FIG. 3B, the films 103 for enclosing and insulating the temperature sensor element 100 connected to the lead frames 101 and the supporter 102 are thermo-compressed and sealed.

FIG. 4 is a sectional view of FIG. 3B, and illustrates upper 102a and lower 102b surfaces of the supporter and a space 105 between the upper surface of the temperature sensor element and the upper surface of the supporter. In FIG. 4, the bottom of the temperature sensor element 100 is flush with a relevant film 103, but the top of the temperature sensor element 100 and a relevant film 103 or the supporter 102 have different heights. The ultra thin temperature sensor element 100 according to the invention may have a thickness of 0.2 to 1 mm, and the supporter 102 is formed to be larger than the temperature sensor element 100.

The bottom of the temperature sensor element 100, may, for example, come into thermal contact 300 with the surface of the battery cell of a notebook computer. On the top of the temperature sensor element 100, the supporter 103 is formed to be higher than the temperature sensor element 100, thus not only protecting the temperature sensor element 100, but also preventing the temperature sensor element 100 from breaking down when subjected to external impact 200.

Further, in the invention, when the temperature sensor element 100 has been mounted on the battery cell of the notebook computer, and is then pressed by a plastic pack, the supporter 102 formed to be higher than the temperature sensor element 100 performs a shock absorption function, thus preventing the temperature sensor element 100 from breaking down.

Figure 5:
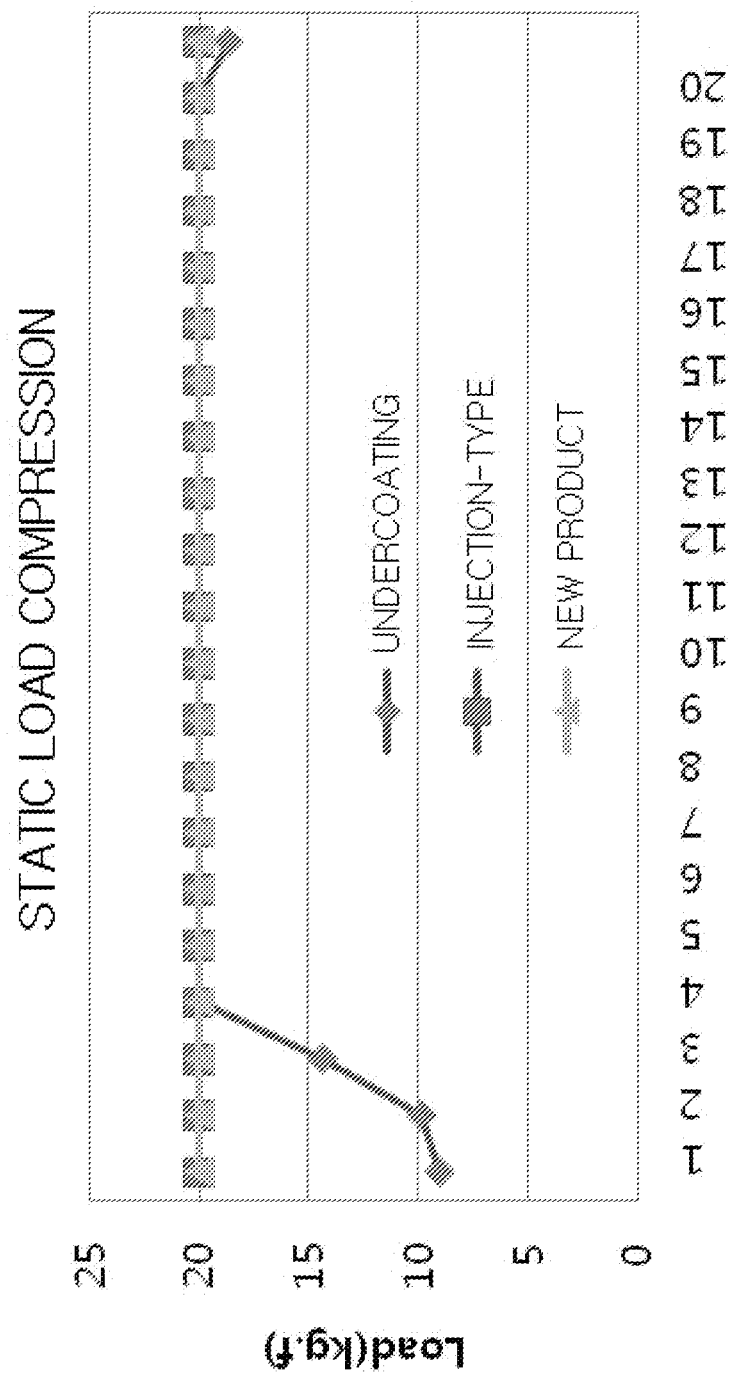
FIG. 5 is a graph showing the compressive strength of the ultra thin temperature sensor device according to an embodiment of the invention.

FIG. 5 is a graph showing the compressive strength of the ultra thin temperature sensor device according to an embodiment of the invention.

As shown in FIG. 5, it can be seen, from the results of measurement of compressive strength on the ultra thin temperature sensor device according to the invention and an injection temperature sensor device, that all of 20 samples resisted up to 20 kgf. Here, the injection temperature sensor device has a form in which lead frames are enclosed with an insulating film and a temperature sensor element is encapsulated by using silicon coating and epoxy injection.

In contrast, an undercoating temperature sensor device shows that three of 20 samples broke down at low compressive strength, and 17 of the 20 samples could resist up to 20 kgf. In this case, the undercoating temperature sensor device has a form in which lead frames and a temperature sensor element are enclosed once with an insulating film.

Figure 6:
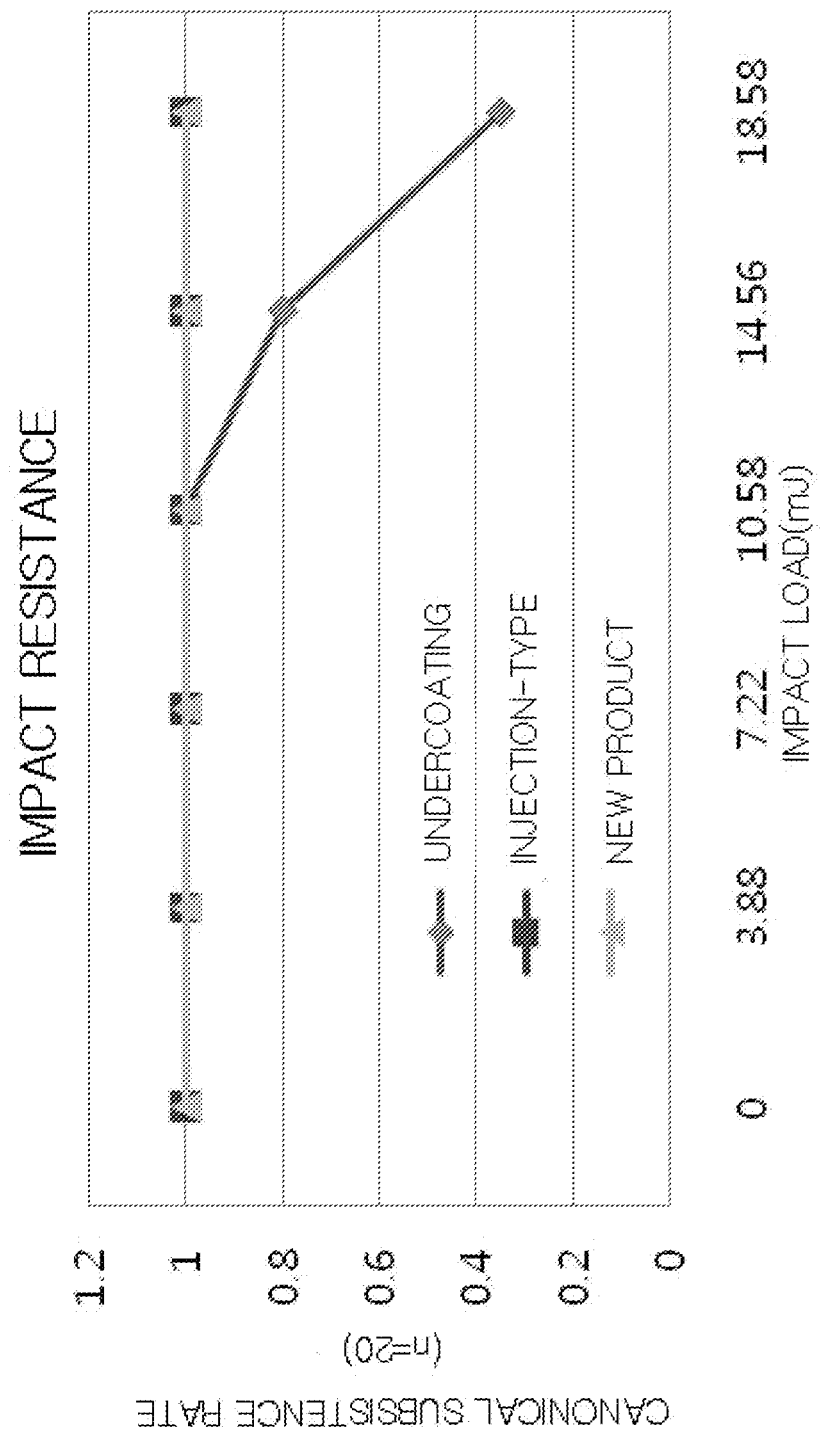
FIG. 6 is a graph showing the impact resistance of the ultra thin temperature sensor device according to an embodiment of the invention.

FIG. 6 is a graph showing the results of subsistence rates for respective steps, obtained by measuring the impact resistance of the ultra thin temperature sensor device according to an embodiment of the invention on 20 samples while changing the energy of impact. In the drawing, '1' denotes that 100% of the samples of sensor elements can subsist without being influenced by impact.

As shown in FIG. 6, it can be seen that the ultra thin temperature sensor device according to an embodiment of the invention and an injection temperature sensor device resisted impact strengths (impact loads) of up to 18.58 mJ on 20 samples without causing any problems.

Meanwhile, an undercoating temperature sensor device resisted up to 10.58 mJ, but started to break down at impact loads exceeding 10.58 mJ.

The above test results show that the ultra thin temperature sensor device according to an embodiment of the invention is as excellent in compressive strength or impact resistance as is the injection temperature sensor device. This means that the ultra thin temperature sensor device according to an embodiment of the invention can be protected.

As described above, the ultra thin temperature sensor device according to an embodiment of the invention is advantageous in that a supporter is formed to be higher than a temperature sensor element, thus not only protecting the temperature sensor device, but also preventing the temperature sensor device from easily breaking down.

Although the preferred embodiments of the invention have been disclosed for illustrative purposes, those skilled in the art will appreciate that various modifications, additions and substitutions are possible, without departing from the scope and spirit of the invention as disclosed in the accompanying claims. Therefore, the scope of the invention should not be limited to the above-described embodiments, and should be defined by equivalents thereof.

What is claimed is:

1. A temperature sensor device, comprising:
a temperature sensor element;
lead frames disposed at lateral surfaces of the temperature sensor element, respectively such that the temperature sensor element is interposed and fastened between the lead frames;
a supporter surrounding the temperature sensor element with the lead frames and exposing an upper surface and a lower surface of the temperature sensor element, the supporter having an upper surface of a height higher than a height of the upper surface of the temperature sensor element and a lower surface of a height approximately equal to a height of the lower surface of the temperature sensor element; and
a first film positioned on the upper surface of the supporter and a second film positioned on the lower surface of the temperature sensor element and on the lower surface of the supporter, the first and second films enclose the temperature sensor element, the lead frames, and the supporter, to form a space between the upper surface of the temperature sensor element and the upper surface of the supporter.

2. The temperature sensor device according to claim 1, wherein the supporter is made of a material selected from among a ceramic, a polymer, and an insulating-coated metal.

3. The temperature sensor device according to claim 1, wherein the first and second films are a polymer-based film.

4. The temperature sensor device according to claim 3, wherein the polymer-based film is one selected from among polyimide, polyester and Teflon films.

5. The temperature sensor device according to claim 1, wherein the temperature sensor element has a thickness of 0.2 to 1 mm.

* * * * *